(12) United States Patent
Hesch

(10) Patent No.: US 7,267,386 B2
(45) Date of Patent: Sep. 11, 2007

(54) MOTOR VEHICLE PASSENGER COMPARTMENT HEAT INSULATION AND DISSIPATION

(76) Inventor: Rolf Hesch, Steinkamp 2c, D-32657, Lemgo (DE)

( * ) Notice: Subject to any disclaimer, the term of this patent is extended or adjusted under 35 U.S.C. 154(b) by 0 days.

(21) Appl. No.: 11/065,134

(22) Filed: Feb. 24, 2005

(65) Prior Publication Data
US 2005/0140180 A1   Jun. 30, 2005

Related U.S. Application Data

(63) Continuation-in-part of application No. 10/435,027, filed on May 12, 2003, now abandoned, which is a continuation-in-part of application No. 09/242,340, filed as application No. PCT/DE97/01710 on Aug. 12, 1997, now Pat. No. 6,561,562.

(30) Foreign Application Priority Data
Aug. 13, 1996   (DE) .............................. 196 32 550

(51) Int. Cl.
*B62D 25/00*   (2006.01)
*B60J 5/00*   (2006.01)
*B60J 25/06*   (2006.01)

(52) U.S. Cl. ..................... 296/39.3; 296/211; 296/208; 296/146.5

(58) Field of Classification Search ............... 296/39.3, 296/208, 211, 146.5
See application file for complete search history.

(56) References Cited

U.S. PATENT DOCUMENTS

| | | | |
|---|---|---|---|
| 973,888 A | 10/1910 | Stillman | |
| 1,901,239 A | 3/1933 | Hein | |
| 2,021,784 A | 11/1935 | Hochstadt | |
| 2,087,651 A | 7/1937 | Mygland | |
| 2,768,672 A | 10/1956 | Doorman | |
| 3,274,915 A | 9/1966 | Ziegenfelder | |
| 3,324,968 A | 6/1967 | De Castelet | |

(Continued)

FOREIGN PATENT DOCUMENTS

| | | |
|---|---|---|
| DE | 2 006 741 | 9/1971 |
| DE | 24 36 219 | 2/1976 |
| DE | 4 001 947 | 8/1990 |
| DE | 39 32 121 | 4/1991 |
| DE | 41 23 593 | 1/1993 |

(Continued)

OTHER PUBLICATIONS

Patent Abstract of Japan, Publication No. 07323792, Publication Date Dec. 12, 1995, Inventor Nagaki Shunsuke, "Manufacture of Insulator Dash for Automobile".

*Primary Examiner*—Dennis H. Pedder
(74) *Attorney, Agent, or Firm*—Browdy and Neimark, PLLC

(57) ABSTRACT

A body part of a vehicle, the body part having: an outer sheet that will form a part of the vehicle exterior surface; an inner part disposed between the outer sheet and the passenger compartment when the body part is assembled to the vehicle; a first infrared radiation reflecting layer on the outer surface of the outer sheet; and a second infrared radiation reflecting layer on the surface of the inner part that faces the outer sheet. The inner part includes a thermal insulation material. The outer sheet and the inner part delimit an air flow path for supporting a flow of air adjacent the outer sheet and in the direction of the length of the vehicle. The air flow path is distributed transversely to the length of the vehicle for transporting heat convectively away from the vehicle.

16 Claims, 7 Drawing Sheets

U.S. PATENT DOCUMENTS

| | | |
|---|---|---|
| 3,328,074 A | 6/1967 | Van Rossem |
| 3,366,026 A * | 1/1968 | Herr et al. .................. 454/137 |
| 3,602,126 A | 8/1971 | Breitschwerdt |
| 3,868,796 A | 3/1975 | Bush |
| 4,584,225 A | 4/1986 | Adelman |
| 4,801,169 A | 1/1989 | Queen et al. |
| 4,807,523 A | 2/1989 | Radtke et al. |
| 4,830,908 A | 5/1989 | Nakajima |
| 4,899,645 A * | 2/1990 | Wolfe et al. ................ 454/131 |
| 5,007,976 A | 4/1991 | Satterfield et al. |
| 5,040,455 A * | 8/1991 | Doi et al. ..................... 454/75 |
| 5,064,714 A | 11/1991 | Yamaguchi et al. |
| 5,111,619 A | 5/1992 | Billin et al. |
| 5,205,781 A | 4/1993 | Kanno et al. |
| 5,248,278 A | 9/1993 | Fuerst et al. |
| 5,395,135 A | 3/1995 | Lim et al. |
| 5,529,824 A | 6/1996 | Walendy |
| 5,567,922 A | 10/1996 | Scmuck et al. |
| 5,595,415 A | 1/1997 | Beaulat |
| 5,806,919 A | 9/1998 | Davies |
| 5,817,408 A | 10/1998 | Orimo et al. |
| 5,934,737 A | 8/1999 | Abouzahr |
| 5,997,077 A | 12/1999 | Siebels et al. |
| 6,288,837 B1 * | 9/2001 | Hubbard ..................... 359/359 |
| 6,988,765 B2 * | 1/2006 | Nagayama et al. ......... 296/211 |
| 2003/0215627 A1 * | 11/2003 | Rosenberger et al. ....... 428/327 |

FOREIGN PATENT DOCUMENTS

| | | |
|---|---|---|
| DE | 1 480 299 | 7/1999 |
| EP | 0 071 914 | 2/1983 |
| EP | 0 363 130 | 4/1990 |
| EP | 0 511 157 | 10/1992 |
| EP | 0 571 640 | 12/1993 |
| FR | 521977 | 3/1921 |
| GB | 1 441 598 | 7/1976 |
| GB | 2 213 097 | 8/1989 |
| GB | 2 216 081 | 10/1989 |
| JP | 0 142 760 | 11/1981 |
| JP | 0 155 165 | 9/1982 |
| JP | 404 271 918 | 9/1992 |
| WO | WO93 11001 | 6/1993 |

* cited by examiner

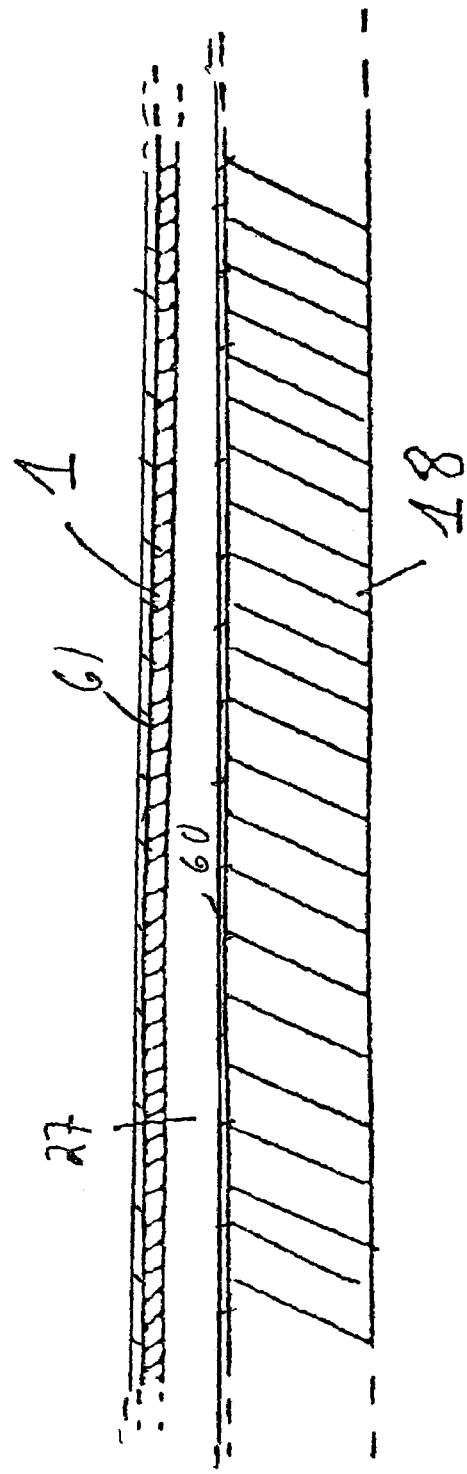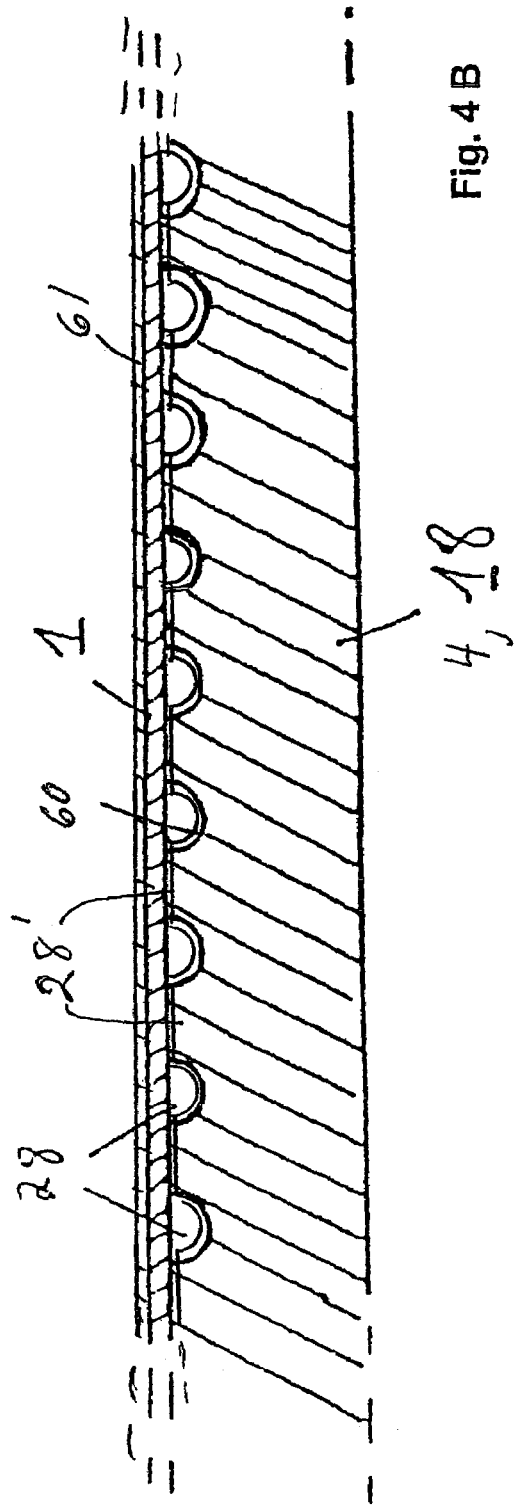

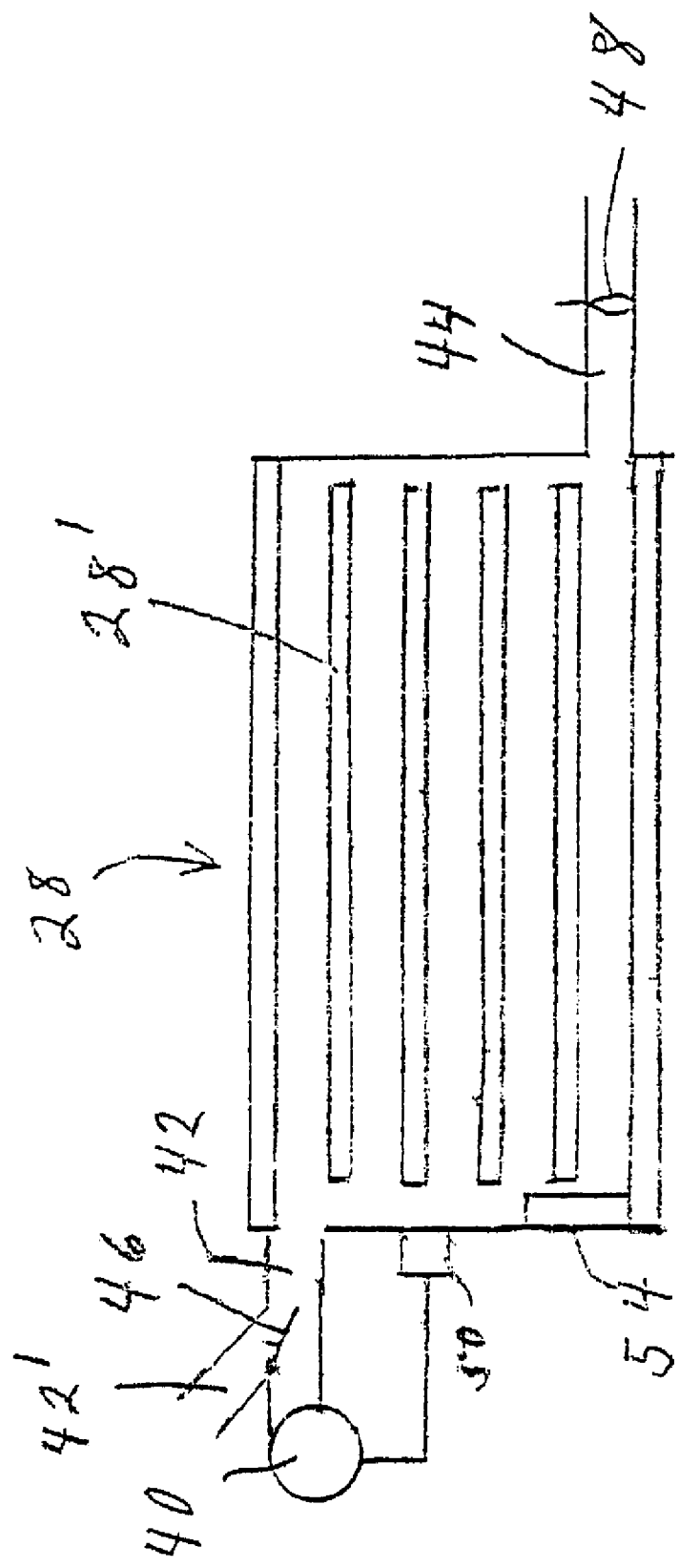

MOTOR VEHICLE PASSENGER COMPARTMENT HEAT INSULATION AND DISSIPATION

CROSS-REFERENCE TO RELATED APPLICATION

This application is a Continuation-In-Part of U.S. application Ser. No. 10/435,027, filed May 12, 2003 now abandoned, itself a Continuation-In-Part of U.S. application Ser. No. 09/242,340, filed Feb. 12, 1999, now U.S. Pat. No. 6,561,562, issued on May 13, 2003, the disclosures of which are incorporated herein by reference.

BACKGROUND OF THE INVENTION

Efforts are being made in the motor vehicle industry, in particular in connection with passenger cars, to reduce fuel consumption and pollution. One approach to this objective is to reduce the weight of vehicles.

Parallel with this, there is an ongoing effort to make vehicles safer, which often results in a weight increase because of additional components, for example the installation of transverse rails in the doors and struts in the vehicle cage. The resulting additional weight cannot even remotely be compensated by savings in the interior fittings.

Because of the trend toward smaller engines with improved efficiency, it becomes increasingly necessary to install auxiliary heaters, especially in vehicles of smaller size and medium size, because smaller engines and improved engine efficiency can result in insufficient waste heat for satisfactorily heating vehicle passenger compartments in cold weather.

In a further, parallel occurring development, it is becoming increasingly common to equip even smaller and medium sized vehicles with air conditioners as standard equipment.

Because of the increased employment of auxiliary heaters and air conditioners, gains that have resulted in reductions in fuel consumption and emissions, have been lost, or at least reduced.

On the average, air conditioners weigh 15 to 16 kg, i.e. by far more than can ever be saved in components of the interior fittings. Added to this is that operation of an air conditioner causes an average fuel increase of 0.6 l per 100 km. If an air conditioner is installed, both the weight savings at other places and the reduced consumption achieved thereby are completely or mostly lost. Driving comfort is increased, but consumption and environmental stress are increased.

Auxiliary fuel heaters weigh 2 to 4 kg on the average and consume 0.2 to 0.4 l of fuel per hour. Passive auxiliary heaters, which recover heat from the waste air of the passenger compartment by means of a heat pump, desorption heaters, and the like are limited in their output, most are heavier than auxiliary fuel heaters and because of the use of electric energy are neither more efficient nor, in particular, more ecologically beneficial.

Thus, parallel developments in the manufacture of passenger cars, each of which, when examined by itself, can be considered to be an improvement, as a whole can cancel each other partially out in regard to their ecological consequences.

From the viewpoint of ecology, the strong trend toward air conditioners in particular is a serious backward step. It leads to a considerable increase in fuel consumption and therefore to increased emissions of pollutants. This becomes clear, inter alia, from the recent demands, even from the automobile club sector, to require that manufacturers of vehicles openly disclose, among other technical vehicle data, the increase in fuel consumption as a result of the use of air conditioners, so that the buyer can clearly see what additional operating costs he or she will face in connection with air conditioners, and most of all what he or she has to pay for the luxury of an air conditioner that imposes additional stresses on the environment.

U.S. Pat. No. 2,768,672 discloses a vehicle having partial thermal insulation, which consists of the attachment or connection of asbestos mats to surfaces of the interior bordering the exterior, and which is limited to this. The intended thermal insulation in this known solution has disadvantages, for example higher weight because of the asbestos mats, which neutralize at least a portion of the advantages of thermal insulation.

Thus, in the prior art, motor vehicles for carrying passengers are heat-insulated only in some regions, if at all. Systematic, complete heat insulation is known only in refrigerator vehicles in which heat-sensitive goods are transported.

As an alternative or supplement to air conditioning systems, there are known systems, for instance made by Audi, that remove heat that has already penetrated into the passenger compartment while the vehicle was parked, again using the vehicle blower. Solar cells integrated into the sunroof, for example, furnish the energy required to do so.

Instead of comprehensive heat insulation and flushing out of the heat that penetrates the outer skin, air conditioners, which provide cooled air that absorbs the heat after it has entered the passenger compartment, are being built into vehicles. Air conditioners present the drawbacks already noted above.

Parent U.S. Pat. No. 6,561,562 discloses the concept of insulating passenger-carrying vehicles as extensively as possible, in order to make air conditioners unnecessary, or at least to make it possible to use air conditioners of smaller capacity and thus, with fewer drawbacks. According to that patent, all of the parts of a vehicle forming its boundary with the outside, or at least those parts enclosing the passenger compartment, can be provided with insulating materials or molded insulating parts, in order to prevent the entry of heat into the vehicle interior in the summer and to prevent the loss of heat in winter. That patent also discloses the possibility of providing the roof of an automotive vehicle with a ventilation gap or ventilation channels that allow an air flow for conducting heat convectively to the exterior.

BRIEF SUMMARY OF THE INVENTION

The present invention achieves reduced energy consumption by, and therefore reduced emissions of pollutants from, motor vehicles, preferably in conjunction with the total insulation that is the subject of the above-cited parent patent.

This is achieved in a manner to substantially reduce the energy required by conventional heating and air conditioning systems to maintain the passenger compartment at a comfortable temperature.

Improvements are achieved, according to the invention, by the provision of a body part of a vehicle, the vehicle having an exterior surface and a passenger compartment, said body part having a longitudinal dimension that will extend in the direction of the length of the vehicle and a transverse dimension perpendicular to the longitudinal dimension and parallel to the exterior surface, and said body part comprising:

an outer sheet having an outer surface that will form a part of the vehicle exterior surface;

an inner part disposed between said outer sheet and the passenger compartment when said body part is assembled to the vehicle, said inner part having a surface that faces said outer sheet;

a first infrared radiation reflecting layer on said outer surface of said outer sheet; and a second infrared radiation reflecting layer on said surface of said inner part, wherein:

said inner part comprises a body of thermal insulation material;

said outer sheet and said inner part delimit an air flow path for supporting a flow of cooling air adjacent said outer sheet and in the direction of said longitudinal dimension, said air flow path extending, or being distributed, over said transverse dimension for transporting heat convectively away from the vehicle;

said air flow path having an air inlet and an air outlet, both communicating with air outside the vehicle when said body part is assembled to the vehicle; and said air flow path is permanently isolated by said inner part from the passenger compartment.

The cooling air flow path, which may be a continuous path or channels across the transverse dimension of the body path, are provided behind the sheet metal or other sheet, in order to reduce heat transmission from the sheet metal to the thermal insulation body, cool the outer sheet from behind and decrease, by reducing the thermal energy contained in the outer sheet, the emission of secondary radiation toward the thermal insulation body. The air flow path creates a ventilating system the function of which is to create an air flow that immediately removes heat that has penetrated the outer sheet by blowing it out of the gap or channels and thus conveying it away from vehicle to the environment. The air flow conducts heat away from the vehicle and cools the associated outer sheet. Thus, the ventilating system ideally does not give heat an opportunity to penetrate the insulating part 18 and enter the passenger compartment.

According to a further feature of the invention, the flow of air through the gap or vent may be halted in order to create a dead air space that provides additional thermal insulation. This would be particularly useful in cold weather to reduce demands on the vehicle heating system.

The present invention incorporates thermal insulation of vehicles, in particular those parts that enclose the passenger compartment, and possibly also adjacent areas of the vehicle in which thermal insulation is possible in accordance with their structure and function, for example trunks, cargo compartments, and the like, as disclosed in parent U.S. Pat. No. 6,561,562. Thermal insulation as referred to herein is to be understood to mean that portions of the vehicle that form parts of its exterior, such as doors, the roof, floor components, door sills, pillars, transverse and longitudinal supports, trunk enclosures and the like, are to be provided with thermally insulating layers or thermally insulating molded parts as insulating bodies to the extent that this is constructively possible.

By means of this it is prevented that in summer heat can flow, scarcely stopped, into the interior, in particular into the passenger compartment, which would, if air conditioning were to be installed, require a correspondingly large cooling capacity. The expense of thermal insulation is very much less than that for an air conditioner, and so is the weight. In contrast to an air conditioner, thermal insulation does not entail any operating costs, or, especially, polluting emissions.

As a rule, an effective thermal insulation will obviate the installation of air conditioners in vehicles in the lower and medium price range, or, at least a much smaller installation will be sufficient. With vehicles that must have an air conditioner in spite of thermal insulation, an air conditioner with a fraction of the cooling capacity of conventional air conditioners will be sufficient. In vehicles constructed according to the invention, air conditioners having less than one-fourth the capacity of conventional air conditioners can be sufficient. Naturally, smaller air conditioners use up less energy and cause proportionally reduced polluting emissions. Also, weight is saved with them, which results in further energy savings.

In addition, the smaller air conditioners that will prove sufficient in vehicles constructed according to the invention have sufficiently low power requirements that they can be powered by solar cells mounted on the vehicle roof. Most motor vehicles have the necessary roof surface to operate small air-conditioning systems with solar power. Then, the air conditioner can operate even when the vehicle is parked and the engine is off. Such air conditioners can be installed so to be easily removable when not need, such as during the winter, thereby saving weight. Thus, it becomes possible to prevent the passenger compartment from heating even when the vehicle is stopped in traffic or parked. As an alternative, the vehicle could be equipped with a blower that blows air into the air flow path of one or more body parts, particularly the roof, and which is powered by an array of solar cells on the vehicle roof. Thus, the blower could operate when the vehicle is parked and the engine is off.

Thermal insulation that reduces the penetration of heat in the summer also prevents the loss of heat in the winter. As will be described in greater detail below, the passenger compartment of vehicles constructed according to the invention can be kept comfortably warm in winter with a reduced use of energy for heating. The amounts of waste heat, which become increasingly less, are then sufficient to heat the vehicles. Auxiliary heaters can be eliminated to a large extent, or at least those with less heat output will be sufficient. In this case, too, weight as well as fuel is saved. Fuel is saved in a twofold manner, namely for the generation of heated air itself, and for carrying the increased weight of the auxiliary heater.

Thermal insulation can be provided to a large extent by the use of renewable raw materials. Therefore these should be preferably used. Renewable materials do not cause emissions, but the opposite instead. In the course of their assimilation, $CO_2$ already present in the air is reduced and oxygen is released. All possibilities of insulating material, or respectively insulating body designs, can be used by the combination with binding agents and foams made from synthetic plastic materials, derivations of natural materials and/or biogenous materials.

Effective thermal insulation also automatically results in an important addition to improved traffic safety: as determined by a study by TÜV [Technical Inspection Service], a temperature increase in the vehicle from 25° C. to 35° C. reduces the fitness of a driver in traffic to the same degree as a blood alcohol content of 0.5 per thousand.

Combined with reinforcement and/or planking elements, for example made of sheet metal, the insulation bodies can also result in considerable mechanical protection and can completely or partially replace the metal rails, which of late have been installed in vehicle doors for improving side impact protection. Omission of the rails could also save weight. Thus, replacement of the rails by rigid and energy-dissipating thermal insulation elements, together with the outside and inside sheet metal panels of doors, will not result in a significant weight increase. A weight reduction might possibly be conceivable; a complete foam filling of, for example, vehicle doors for the purpose of thermal insulation already demonstrably increases the moment of impact resistance of the door considerably in comparison with a hollow door as is constructed in accordance with the prior art. In the course of tests, the reinforcement of the thermal insulating foams by long fibers, yarns, stalks, non-wovens, fabrics and similar structures, preferably made of renewable raw materials, has resulted in a further considerable increase in strength. Even when reducing the sheet metal thickness by half, it was possible to achieve strength values that lay far above those in accordance with the prior art, and this even with a reduced total weight.

Thermal insulation as described herein with additional reinforcement steps also achieves safety functions in a dual manner: even without air conditioners, or with low cooling capacities, it is possible to maintain the interior climate of vehicles in ranges that are helpful to the driving fitness of the driver. In the case of a crash, a vehicle provided with thermal insulation in the described manner offers great sturdiness and a large ability for absorbing impact energy. These thermal damping elements also do not splinter into sharp edges.

Further advantages of the thermal insulating elements reside in acoustic insulation. A low noise level in the vehicle, besides a pleasant temperature, is a further prerequisite for a very good driving fitness of the driver. He does not get tired as quickly and is less stressed by nerves. Already, some vehicle manufacturers reduce the interior noise generation in particularly critical zones by means of felt. Separate acoustic insulation measures are superfluous in an intensely thermally insulated vehicle, since thermal insulation designed in this manner also increases acoustic insulation as an intentional or unintentional side effect.

Thermal insulation measures taken in accordance with the invention disclosed in the parent patent permit a reduction of the thickness of the body sheet metal without loss in strength, especially if the thermal insulation elements are fixedly connected with the body sheet metal, for example by foaming or adhesion. Insulating elements, in particular those reinforced in the described manner, can partially assume supporting functions in the place of sheet metal—a considerable contribution to easier recycling and better ecology.

Besides the above mentioned tendencies, which are counterproductive from an ecological point of view, developments in vehicle construction also include a tendency toward "vehicle modules". For example, in the future a door should no longer be delivered in many individual parts by different suppliers to the passenger car manufacturer and only be assembled there, but should be delivered completely as a "module", so that it need only be hung. Thermal insulation elements produced in the described manner can, if they are reinforced in accordance with the invention, take on the functions of a support of functional elements, for example window lifts, door locks, etc., in addition to thermal insulation and accident protection, and with a decorative interior can replace the interior panel of the old style as a decorative single purpose element, so that to this extent the solution described above also takes this development into account.

Thus, the heat load on the passenger compartment is reduced as much as possible by flushing out heat prior to its transmission into the actual thermal insulation body, so that the permissible thickness of the thermal insulation body is sufficient to attain the desired insulation effect. In addition, by providing one or more flaps, or doors, to close the air flow path or channels in the winter, an additional insulation layer in the form of trapped air is provided.

In further accordance with this invention, one or more reflective coatings to reflect the largest possible portion of IR radiation before it can be absorbed by vehicle components are provided on the outer surface of the outer sheet and/or on the surface of the insulation body the faces the outer sheet.

The invention is further implemented by high-quality sun protection glass panes (sun reflection glass panes), which can reduce the amount of heat transmission through the glazings to approximately $\frac{1}{5}$ of conventional types of glazing. Sun reflection glazings of this type are known in art, but, when combined with the other features of the invention, make a substantial contribution to reducing the heat energy that flows into the passenger compartment.

BRIEF DESCRIPTION OF THE DRAWINGS

FIGS. 4A and 4B are two cross-sectional views through a motor vehicle roof with air flow paths according to the invention.

FIG. 5 is a partly schematic plan view of a vehicle roof having the air flow path of FIG. 4B.

DETAILED DESCRIPTION OF THE INVENTION

By their nature, thermal insulation bodies alone cannot lower the inside temperature of a vehicle below the outside temperature. Instead, the temperature in the passenger compartment will always be 2 to 5° C. above the outside temperature. If the outside temperature is, e.g., 20° C., the inside temperature of 22 to 25° C. will be within the "comfort range". If the outside temperature is 30° C. on the other hand, a temperature of 32 to 35° C. will develop in a standing vehicle. As compared to non-thermally insulated vehicles, in which up to 70° C. will be reached in the standing vehicle, this is already significant progress. However this is not sufficient by today's standards. The layer thicknesses of insulation bodies are limited in vehicle construction for reasons of design. It is impractical to lower the inside temperatures to be within the "comfort range" in hot weather simply by selecting the thickness of the insulation bodies alone. Only the set of complementary measures according to the invention can increase the effect of the insulation bodies to such a degree that a "temperatures within the comfort range" can be reached without a vehicle-motor driven air-conditioning system. The measures shall be explained in more detail below.

Figure 1:
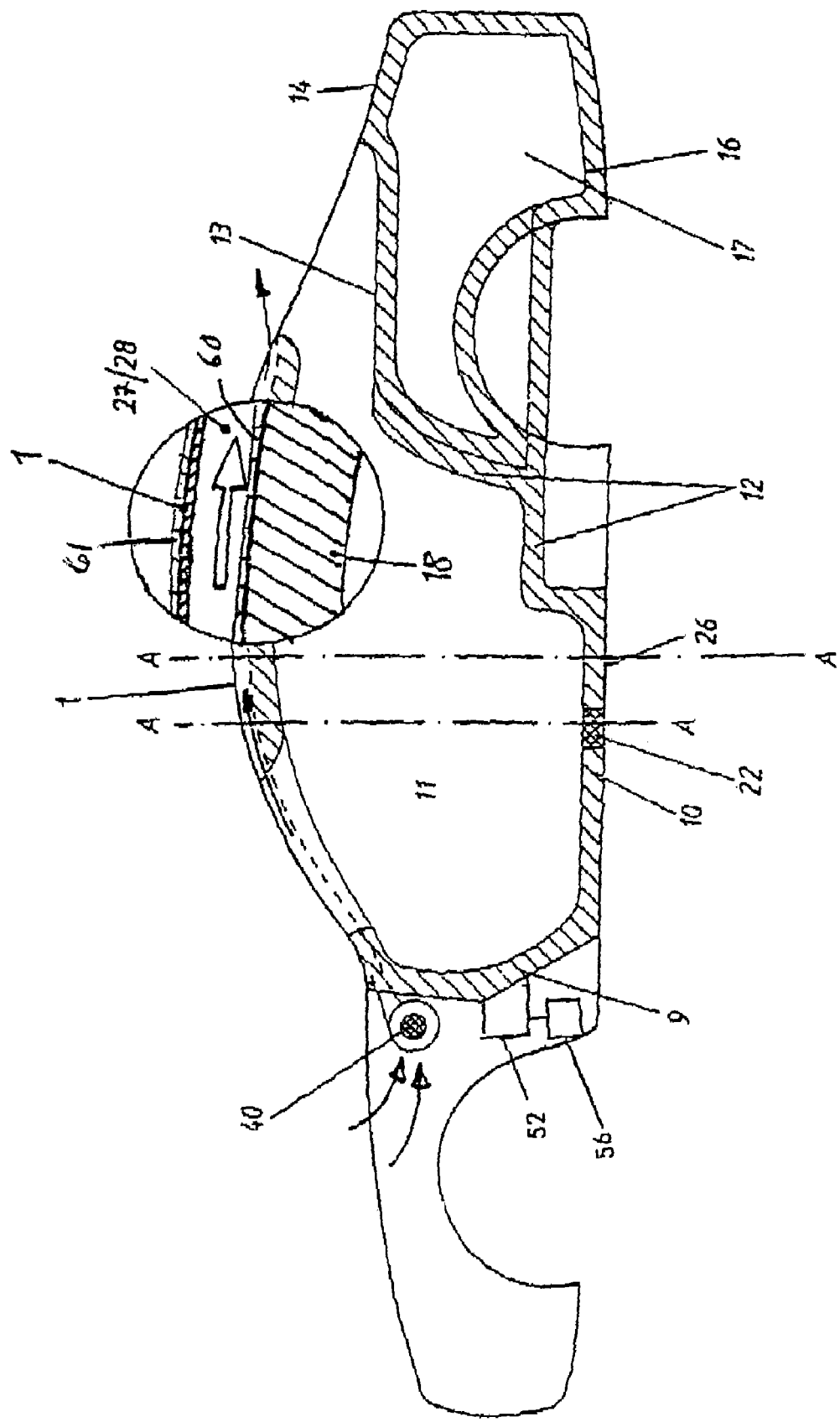
FIG. 1 is a longitudinal cross-sectional view through a motor vehicle body with areas of thermal insulation and a flow passage according to the invention.
Figure 2:
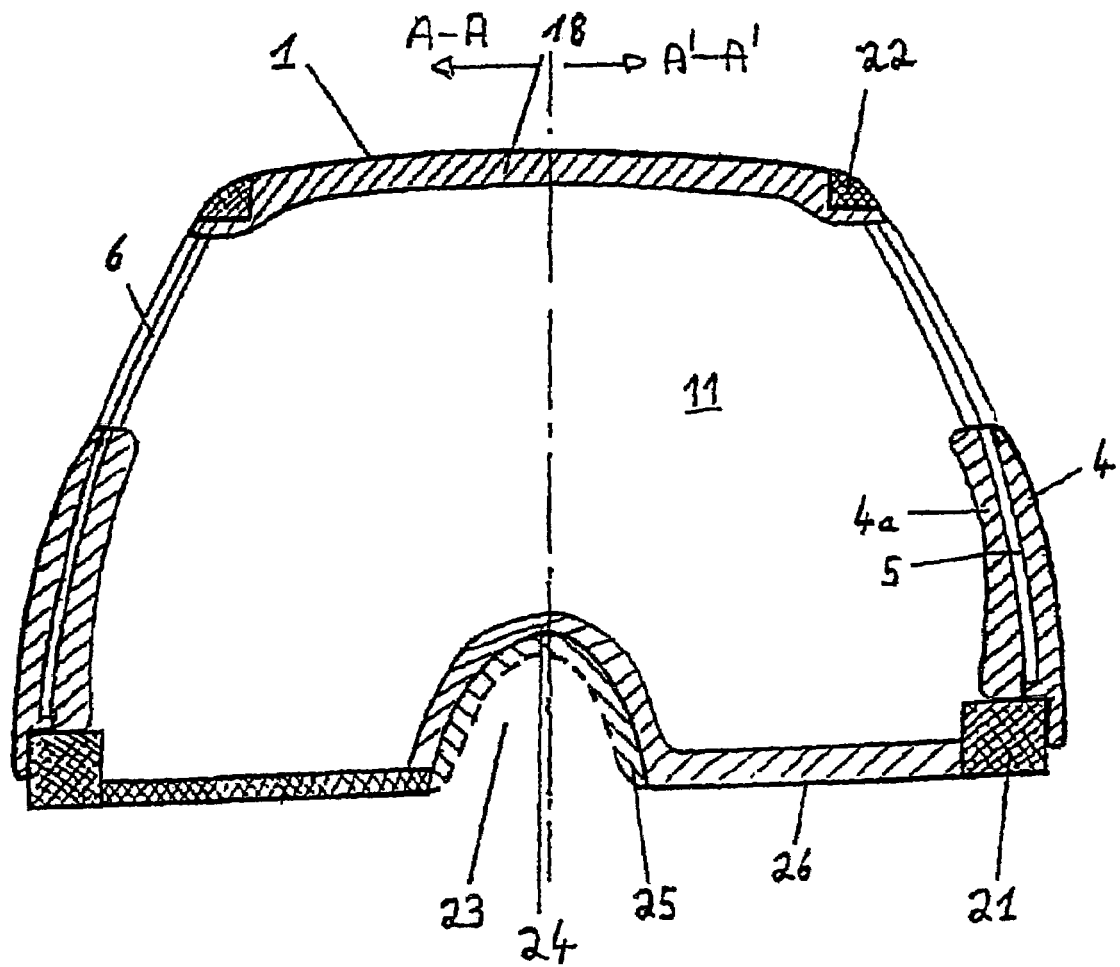
FIG. 2A is a divided elevational cross-sectional view of a vehicle as disclosed in the parent application, the left side being taken in a plane corresponding to plane A-A and the right side being taken in a plane corresponding to the plane A'-A' of FIG. 1.
FIG. 2B is a cross-sectional view similar to that of FIG. 2A of a vehicle having a roof constructed according to the invention.
Figure 2:
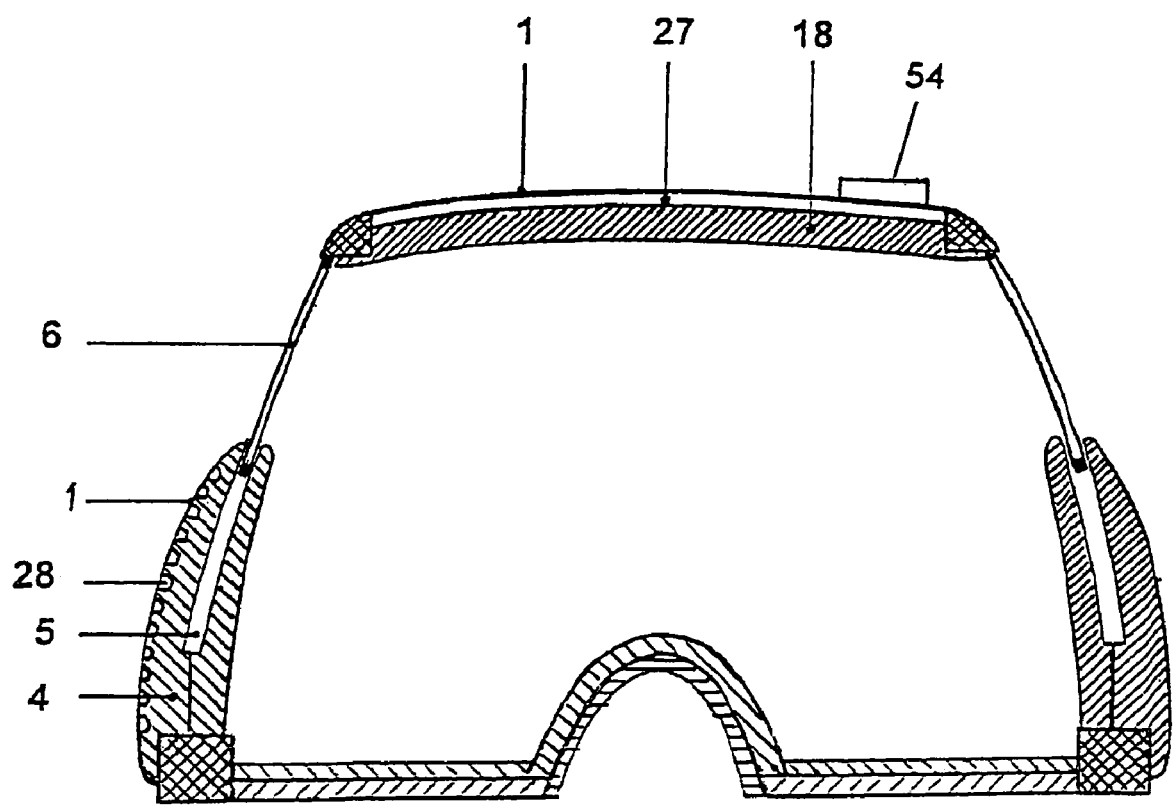

FIGS. 1, 2A and 2B show the essential structural areas of a motor vehicle that can be provided with thermal insulation as described in the parent patent. The hatched areas in FIG. 1 represent the built-in insulating layers and molded insulating parts.

In this connection it is basic that, depending on the functions and specific loads on each one of these areas, it is possible to select a thermal insulation, either as an insulating body of a preselected shape, or as a thermal insulating material whose shape is only created during or after its application on an associated component, for example by foam application/heating which, because of its further properties, even complements and improves the basic function of the associated component. Thus, novel functioning units with qualitatively improved properties, not only in respect to the desired thermal insulation, but also in respect to mechanical strength, acoustic insulation, weight reduction, etc. are created by means of the integration of the respective thermal insulating material.

There are often hollow spaces in a vehicle body part, located between an inner part and the outer skin 1, examples of this to be mentioned here are the rails 22, door sills 21, and the area between the inner and outer wheel well. According to one feature of the invention, these rails and sills may be filled with insulation material to provide further insulation improvements.

Here, thermal insulation is ideally achieved by foam application. Only a small opening in the respective hollow space is needed for inserting the insulating material in liquid form. Curing, or respectively polymerization, of the plastic material used, for example polyurethane, only takes place after this. With many plastic materials, the start of foaming can be initiated from the outside, for example by first placing unfoamed contoured pieces into the hollow space, which are then caused to foam up by the effects of heat.

Insulating material is selected in the area of the instrument panel, or dashboard, the firewall and the floor 9 which, besides good thermal insulation properties, also has resilient and/or shock-absorbing properties, in order to reduce the danger of head or knee injuries in particular to the driver and front seat passenger in case of an accident.

While mostly rigid preformed elements are provided as insulating bodies for thermal insulation in the area of the instrument panel, in the area underneath the instrument panel and/or firewall 9, foam application of a thermal insulating material or gluing-on of resilient insulating mats are also conceivable. In any case, in the case of body parts that are subject to impact, it is important that the insulating material be fixedly connected with the sheet metal in front of it, for example is glued to it. Only in this way is it possible to achieve optimal energy dissipation in case of an impact.

In this area 9, which borders the engine compartment, the thermal insulation can also provide a contribution to acoustic insulation, for example by a suitable profiling (egg carton profile) toward the engine compartment.

In the floor area 10, a material, for example a composite material, has been selected for thermal insulation, which has a hard surface capable of resistance, since this area is greatly mechanically stressed, particularly by entrance and exit of the driver and passengers.

If the rear area 12 of the passenger compartment is to be thermally insulated from the trunk 17, it is recommended to integrate a suitable insulating body in the seat and/or the seat back. This can be done in such a way that panels made of a thermal insulation material, for example a composite of natural fibers or also styrofoam, are worked into the seat and/or seat back 12, or that the seat and/or seat back 12 are made of self-supporting, insulating preformed insulating elements.

The rear window shelf 13 is preferably produced as a self-supporting plastic or expanded rigid polyurethane element of sufficient thickness. Although such components have already been made of expanded foam and composite materials, this was done in view of the weight savings that could be achieved by this along with sufficient stability. The thermal insulating effect achieved by means of this is therefore negligible in actual use, in particular because of the too small portion of these surfaces on the outer surface of the passenger compartment.

In the area of the underbody 26 and the transmission tunnel 23, a thermal insulation 25 is also provided on the outside besides the thermal insulation 24 on the inside. This can be achieved, for example, by foaming impact-resistant plastic onto the entire underbody group. The application of one or several preformed elements is also conceivable. In addition to thermal insulation, protection of the underbody 26 against salt, thrown rocks, etc. is also achieved. In case preformed elements are used for thermal insulation, it is conceivable to make them in the form of easily replaceable "wear elements" because of the high mechanical stresses to which they are exposed. In this case care should be taken in particular that a good recycling ability of the used insulating material is provided.

For thermal insulation of the areas 14 bordering the trunk 17, preformed elements made of a hard plastic are provided. For example, the trunk lid can be insulated by means of an insulating body made of foam material.

In vans, station wagons and similar types of motor vehicles, the cargo compartment takes the place of the trunk and can be correspondingly included in the total insulating measures. The importance of the trunk, or respectively of the cargo compartment, for thermal insulation lies in an "enlargement" of the passenger compartment by including this volume in the ventilating and/or air conditioning system of the motor vehicle, because of which the oxygen supply can be increased, the supply of exterior air reduced and in this way the thermal insulation balance improved.

Particular importance is placed on the insulation of the roof area 18, since it is particularly strongly heated by the sun in summer. To this end it is provided to make the headliner of a plastic material having a particularly high thermal insulation value. Here, too, solutions using expanded foam or composite materials are known, however, as mentioned above in connection with the rear window shelf, without a noticeable thermal insulating effect of the total system known as the "passenger compartment".

Figure 3:
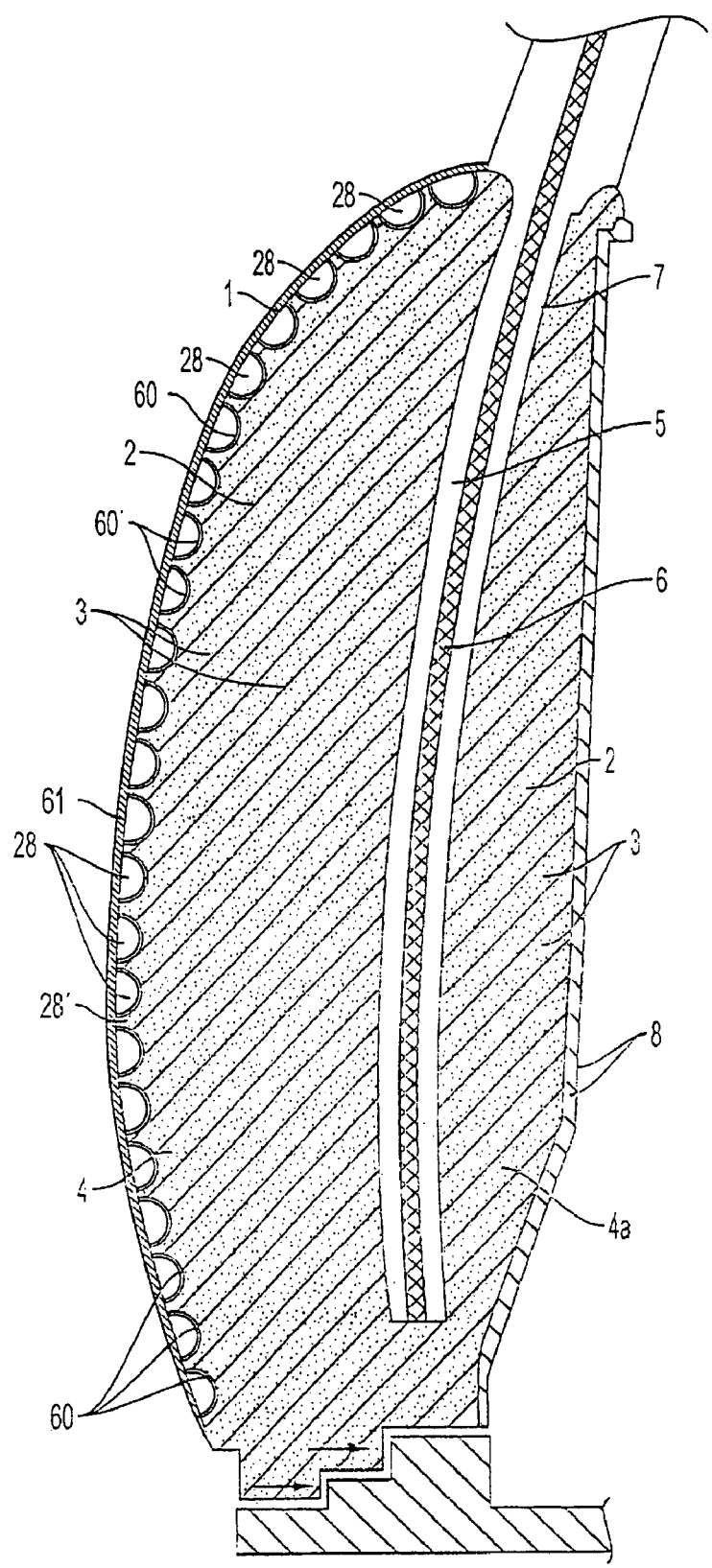
FIG. 3 is an elevational cross-sectional view through a motor vehicle door with thermal insulation and an air flow path in accordance with the invention.

Since the vehicle roof, which in most cases has a sheet metal skin, can heat up very strongly, in particular when traveling slowly or when in a traffic jam, it is furthermore provided to arrange an air flow path, or ventilating system, formed, for example, by a ventilation gap 27, or a system of passive ventilating elements, such as ventilation channels 28, for example, which communicate with the outside, between the thermal insulation and the inside of the sheet metal of the roof. By means of this it is possible to transport heat convectively to the outside. In this case convection can be aided by passing the slip stream through or by using a separate ventilation. Such an interior ventilation can of course also be employed in other vehicle areas, such as in a door as shown in FIG. 3. For the area of the roof in particular, such passive ventilation can also be aided by active ventilating elements. In this case it is possible, for example, to use blowers, which can also be operated by solar cells that can be housed in the roof or the bumpers. As shown in FIG. 1, the vehicle interior can also be cooled by a small air conditioner 52 powered by photovoltaic elements 54 (shown in FIG. 2B) directly or via storage batteries 56.

Particularly in the case of the roof, gap 27 extends, in the direction perpendicular to the air flow direction, across the entire usable space between the outer sheet and the inner part. Particularly with regard to the doors, as shown in FIG. 3, channels 28 extend horizontally and are spaced apart in the vertical direction across the entire usable space between the outer sheet and the inner part.

Thermal insulation of the door is provided in two parts in the illustrated exemplary embodiment shown in FIGS. 2A and 2B. An outer preformed body 4 is connected with the inside of the exterior sheet metal 1. Since, as a second effect, besides the thermal insulation, an increase in the rigidity and the energy dissipation capability during deformation (side impact protection) is also intended, two measures have been taken: for one, the preformed body is connected, at least at spaced points, over its entire surface with the inside of the exterior sheet metal, for example glued to it, and then reinforcements 3, for example high-strength plastic fibers, have been worked into the preformed body 4.

An inner preformed body 4a (FIG. 2A) is located on the inside of the door. A hollow space 5 for receiving the window 6 is located between the two preformed bodies. The inner preformed body 4a supports the required function and handling elements, such as guide and lifting elements for the window 6, door closing apparatus, and the like. Decorative elements 8 are provided on the side of the preformed body 4a facing the interior. Furthermore, holders for loudspeakers and channels for cables are provided. The inner preformed body also aids in the stiffening of the door, for which reinforcements 3 have also been provided inside the preformed body 4a.

Inner preformed body 4a takes on a total of four tasks: thermal insulation; increasing mechanical stability; as a component support; and as interior decoration, and therefore represents a special example for the possibilities of thermal insulation.

All insulating measures described above can of course also be employed if the body or parts thereof have been made of plastic.

The following will focus on the air flow spaces that characterize the present invention.

FIG. 1 shows one example of a ventilating system according to the invention in the roof between the outer sheet, or skin, 1, which is usually made of sheet metal, and the molded insulating part 18, which may also form the headliner. The ventilating system can be embodied either as a venting gap 27, as also shown in FIGS. 2B and 4A, or as a venting conduit system 28, as also shown in FIGS. 4B and 5.

As already noted at the outset, the function of the ventilating system is to create an air flow that immediately removes heat that has penetrated the outer sheet 1 by blowing it out of the gap or conduit system and thus conveying it away from vehicle to the environment. The air flow conducts heat away from the vehicle and cools the associated outer sheet. Thus, the ventilating system ideally does not give heat an opportunity to penetrate the insulating part 18 and enter the passenger compartment.

When the vehicle is being driven, the ventilating system can be operated passively, because the dynamic pressure of the air moving past the vehicle will flow into inlet openings at the front of each body part, through the venting gap 27 or the venting conduit system 28, and then out through outlet openings at the rear of the body part. This air flow flushes out heat that has penetrated outer sheet 1.

The inlet openings, which can be regulated and closed, are not shown in FIG. 1, but are shown schematically in FIG. 5. Depending on engineering and design requirements, these openings can be accommodated at any arbitrary point in the engine compartment, in or above the hood, in the A-pillars, or at the transition from the windshield to the roof.

When the vehicle is stopped, or is moving slowly, no dynamic pressure for passive ventilation is available. In that case, active ventilation elements must be available. These may primarily comprise a blower 40, which in FIG. 1 is shown as a positive pressure blower in the front region of the vehicle. Blower 40 can be the blower of the vehicle climate control system or can be an auxiliary blower. Air can be forced through a passage provided in one or each A-pillar into the ventilation path 27/28, for instance in the roof. However, a suction blower can for instance be accommodated in the trunk, or at some other point, in place of or in addition to blower 40 to aspirate the air from ventilation path 27/28 and expel the heated air to the ambient air via outlet passages in, for example, the C-pillars. It is also technologically feasible to use cross-flow blowers directly at the transition from the roof to the rear window, to avoid having to carry the heated air through the C-pillars. The energy for operating the blower(s) when the vehicle is not running could be furnished by solar cells directly, or by batteries.

While driving slowly or in a traffic jam, it should be possible as needed to switch on the blower(s), which can then draw their energy from the vehicle alternator.

When the inlet and outlet openings of the ventilation path 27/28 are closed in winter, a layer of dead air is created between the outer sheet 1 and the various insulating bodies 18, 4, and others, thus providing one additional insulating layer against the cold.

FIG. 2A shows the cross, section of a heat-insulated passenger car as described in the parent patent, without ventilation elements 27/28 in the roof and doors.

FIG. 2B shows the same vehicle cross section as FIG. 2A, but with a venting gap 27 in the roof and a venting conduit system, or channels, 28 in one of the doors, although either a gap 27 or a conduit system 28 could be provided in each of the doors, and in the roof. However, since the roof as a rule does not support a load and is not subject to impact, venting gap 27 can extend over its full width, as shown. Such a gap 27 offers a larger open cross section and a lower wall/air friction than the venting conduit system 28 and is therefore especially well suited to assure intensive heat dissipation in the region of the roof, which after all is what is most severely exposed to the sun.

For the doors, conversely, in the example shown, recourse has been made to the venting conduit system 28. The exposure of the doors to the sun is less than for the roof, so that a cooling and flushing air course that is not so large and not as free of friction is not a substantial disadvantage. Instead, the system with venting conduits 28 makes it possible for the outer sheet 1 to be adhesively bonded over its full surface to molded insulating body, via webs, or bridges, 28', shown more clearly in FIGS. 3 and 4B, between individual venting conduits 28, 4 to make a composite molded part. This offers several times the rigidity of a construction with gap 27, in which the outer sheet 1 and insulating body 18 cannot be adhesively bonded to one another. The outer door element 4, in combination with the outer sheet 1 adhesively bonded to one another over the full surface, or welded or otherwise firmly joined, results in a composite material of very high strength, high-quality heat insulation and high-quality side-impact protection at the same time.

FIG. 3 shows, in greater detail, a motor vehicle door that provides both heat insulation and side-impact protection simultaneously. The door is composed of outer sheet 1, usually of sheet metal; foam insulating materials 2 that provide heat insulation and that may contain embedded fibers 3 or the like that provide mechanical reinforcement and a high bending strength. Insulating materials 2 with embedded fibers 3 form fiber-reinforced molded bodies 4 and 4a that act as heat insulators. Body 4, by its firm bond with the outer sheet 1, also offers side-impact protection. Additional insulation is provided by infrared radiation reflecting layer 60 in conduits 28 and a further infrared radiation reflecting layer 61 on outer sheet 1.

FIG. 4A shows in detail a ventilation gap 27, extending over the full width of the roof, between outer sheet 1 and molded insulating part 18, as one of many possible exemplary embodiments.

FIG. 4B shows a conduit system 28 composed of channels that are sealed except for the air inlets and outlets at the front and rear, respectively, of the body part. Via the webs 28', a firm connection between molded body 4, 18 and outer sheet 1 can be produced in the manner described, which would lead to great strength of the roof or other vehicle parts. Conversely, the cooling effect would be less than in the case of FIG. 4A, since the open cross section of the conduit system 28 is less, and the wall friction with the air is greater, than those of the cooling gap 27.

FIG. 5 is a simplified pictorial plan view of one embodiment of the elements forming an air flow path in the roof of a vehicle according to the invention. This embodiment is constituted by a conduit system 28 providing a plurality of channels that are separated by webs 28' that extend between the outer skin and the inner part of the roof. The channels extend in the direction of the length of the vehicle. At the front of the roof, the conduit system is provided with an air inlet channel 42, while at the rear of the conduit system there is provided an air outlet channel 44. Inlet channel 42 includes a bypass duct 42'.

Blower 40 is disposed at the inlet end of channel 24 and a pivotal door, or valve, 46 is mounted at the junction of channel 42 and duct 42' and is movable between a position for blocking duct 42' and a position for blocking the output of blower 40. Outlet channel 44 is provided with a door, or valve, 48 that is movable between a position for opening channel 44 and a position for blocking channel 44. Operating power is supplied to blower 40 by solar cells, or photovoltaic elements, 54.

Blower 40 may be the blower of the vehicle heating system, or may be an auxiliary device provided for supplying air only to the air flow path. In the latter case, blower 40 may be powered by current supplied from a photovoltaic solar cell system 50 mounted on the vehicle roof.

Preferably, air in channel 42 and duct 42' may be provided within an A-pillar of the vehicle, and channel 44 may be provided in a C-pillar of the vehicle. Inlet channel 42 may open under the hood of the vehicle, while duct 42' opens to the outside either above the vehicle hood or at the vehicle fender. Channel 44 may open at a location above the vehicle trunk. As illustrated, it would be preferable for inlet channel 42 to be located at one side of the vehicle and channel 44 to be located at the opposite side to promote a uniform air flow across the width of the roof.

When the vehicle is in motion, blower 40 may be turned off and door 46 moved to a position to unblock duct 42',
while door 48 is moved to its open position. Then, the motion of the car will produce an air flow through duct 42', the channels of system 28 and outlet channel 44 to carry off heat in hot weather. When, in hot weather, the vehicle is stationary, door 46 will be moved to a position to block duct 42', door 48 will be in the open position and blower 40 will be turned on the produce a flow of forced air through the conduit system.

In cold weather, door 46 can be moved to the position to block duct 42', blower 40 can be turned off, thereby blocking any flow of air through duct 42 and, if desired, door 48 can be moved to the closed position. As a result, a dead air space will be formed within the conduit system to provide an additional layer of insulation.

Of course, as already described above, conduit system 28 could preferably be replaced in the vehicle roof by venting gap 27, which would be configured to extend essentially across the entire width of the roof.

According to a further feature of the invention, reflective coatings, or layers, 60, 61, shown in FIGS. 1, 4A, 4B and 6, are included in the thermal insulation system. These provide an additional very effective measure for preventing the flow of heat into the vehicle passenger compartment.

The invention provides two approaches to infrared radiation reflection, with striking effectiveness potential.

According to the first approach, IR-reflective vehicle paint 61 forms a "frontline" in the defense against IR radiation. Paints of this type may be created, for example, through metallic or other IR-reflective additives within the nanoparticle range added to the transparent clear, or top, coat. IR-reflective top coats of this type reflect visible radiation only to a very small degree so that the color effect of the pigmented color paints (primary paint coat) underneath the top coat is changed only to a small degree IR-reflective clear coats within the meaning of the present invention, depending on the quantity and type of added nanoparticles, reflect 20 to 70% of the incident IR-radiation.

IR-reflective clear coats must not be confused with metallic color paint coats. It is true that in the latter, metal particles also have a certain reflection effect, but this effect is quite limited. The metal particles that are used in this case, usually aluminum, must have a flake-like flat shape and must be able to orient themselves parallel to the sheet metal surface. This is the only way the metallic effect can be achieved. They range in size in the upper micrometer-range. They, are embedded in the pigmented base coat (color paint coat), which absorbs IR radiation to a considerable degree, in contrast to IR-reflective clear coats. The portions of the IR radiation that reach the metal flakes and are reflected from there are only partly returned to the surrounding area. A significant portion is also absorbed on the way back, so that metallic paints, contrary to the first impression, absorb more IR radiation than they reflect and must therefore not be confused with IR-reflective transparent lacquers. Their mode of action is completely different.

Metallic paints promote heat build-up almost as much as standard nonmetallic paints.

The IR-reflective paints according to the invention paints will cause a large portion of the incident IR radiation to be reflected from the vehicle before it can reach the sheet metal and heat it up. The sheet metal would then be heated to a considerably lower temperature than without such reflective paint. This would offer the advantage that the sheet metal would store less energy and consequently emit less secondary radiation to the underlying thermal insulation body. Then cooling air through gap 27 or conduits 28 will lower the temperature of sheet metal 1 to a greater degree than without reflective paint 61. This lowering of the temperature, in turn, will reduce the intensity of secondary radiation toward the thermal insulation body and thus the sum of the heat load on the thermal insulation body.

As IR reflecting additives for transparent top coats with selective reflection, the following are possible, for example:
  nanoparticles of silver, gold, aluminum and others,
  oxides of iron, chrome, nickel and others.

If optical effects are not a problem, additives used in metallic lacquers may also be added to the transparent lacquers, i.e., for example Al flakes. If this is done, one needs to expect that the color paint coats underneath will be attenuated in their color effect.

According to the second approach, an IR-reflective coating, or layer, 60 is applied to the surface of a thermal insulation body 4, 18 that faces sheet metal 1. Even though the temperature of the sheet metal and, hence, the secondary radiation therefrom is considerably reduced by the cooling air flow and reflective paint 61, a reduced level of secondary radiation still remains in effect. The surface of the thermal insulation body would absorb the same and heat up. There would be nothing standing in the way of a heat transition of this residual heat. Here, one last possibility offers itself to once more reduce the heat load acting upon the thermal insulation body by a significant degree by means of reflective coating 60 on the thermal insulation body surface, and to thus increase further the sum of the measures that reduce the load on the thermal insulation body.

For coating the insulating members, any additive that reflects rays is suitable. These include:
  all reflecting metals and metal films, e.g., Al film;
  all metallized films;
  all bronze paint coats;
  all additives of metallic paint coats if they are bound in transparent lacquers or transparent resins;
  metallic nanoparticles of silver, gold, aluminum and others, as well as their oxides if they are added in the matrix in sufficiently high density. The higher the density, the higher the reflection, but also the lower the light transmission.

In further accordance with the invention, one or more of the glass panes in the vehicle, including panes 6, the windshield and the rear window, can be constituted by high-quality sun-protection glass panes, such as infrared radiation reflecting solar protection windows, which are already known from the prior art. These may be types of glass that are already in use infrequently because they are expensive. They are expensive due to high material and manufacturing costs, and particularly because they are manufactured in very small quantities. With modern sun protection glass panes the heat being transmitted into the vehicle can be reduced to approximately ⅕ of that of normal glazing. These high-quality glazings, which are known per se, are an important component in connection with the inventive measures for a full thermal insulation of motor vehicles.

By using all or most of the measures described above for thermal insulation in combination with a solar-operated small air-conditioning system, a vehicle can be kept cool in hot weather even when at a standstill and when parked, to the same degree as vehicles equipped with conventional air-conditioning systems and with the motor running. It would not be necessary to let the air condition run for a long time on hot days prior to resuming a trip before being able to enter the vehicle after having parked it for an extended period of time. In hot climates, it would not be necessary to have the air conditioning run for hours in an idling vehicle to keep the inside temperatures bearable. Not only will the motor vehicle comfort be increased to a hitherto unknown degree even in standing and parked vehicles, but a significant reduction in emissions and operating costs would be attained at the same time.

Figure 6:
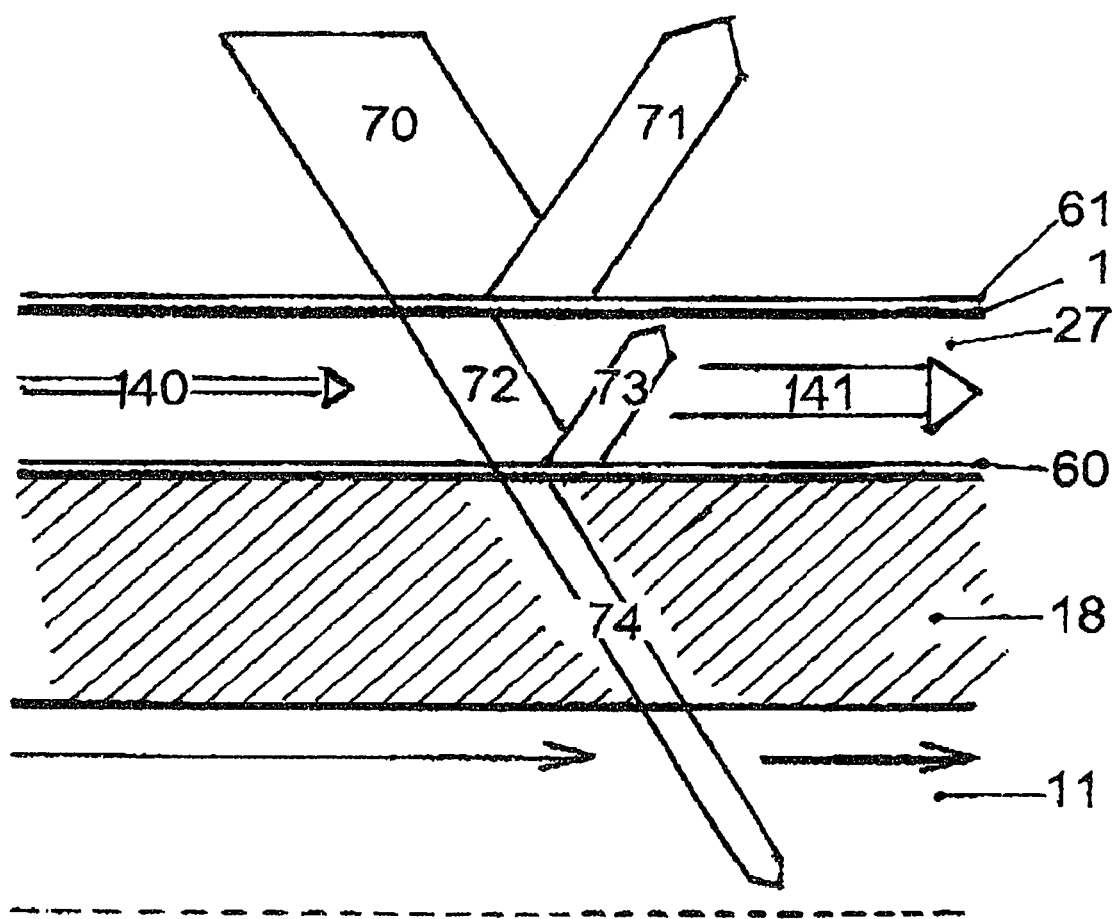
FIG. 6 is a diagram illustrating heat flows in a body part according to the invention.

FIG. 6 depicts the heat removal or rejection effects of the various features of the present invention. IR radiation 70 from the sun impinges on a vehicle at varying angles, e.g., upon the vehicle roof, which is coated with a reflective paint 61. The paint reflects a substantial portion 71 of the incident IR radiation and thus prevents this portion this portion from being absorbed by roof outer sheet 1. Heating of sheet 1 is reduced accordingly.

If sheet 1 were in direct contact with thermal insulation body 18, heat absorbed by sheet 1 would immediately transition by heat conduction into thermal insulation body 18 and then flow by heat transition into passenger compartment 11. However, in accordance with the invention, a gap 27 or channels 28 providing cooling air flow beneath sheet 1 is disposed between sheet 1 and thermal insulation body 18. Through this cooling gap or channels, cooler ambient air is channeled as the cooling air 140. The cooling, air gap or channels 27/28 initially stops heat absorbed by sheet 1 from transitioning from sheet 1 to thermal insulation body 18. A substantial portion of this heat instead transitions to the cooling air and is carried away from the vehicle by heated air stream 141 into the environment.

Heating of sheet 1 can nonetheless not be prevented entirely. As a result, it cannot be completely prevented that sheet 1 will emit secondary radiation 72 in the direction of thermal insulation body 18, albeit in a significantly reduced amount. If nothing were done about it, this secondary radiation would be absorbed by thermal insulation body 18 and flow by heat conduction 74 into passenger compartment 11. However, by also coating the surface of the thermal insulation body 18 that faces sheet 1 with reflective coating 60, e.g., an aluminum film or paint, coat with metallic or other reflective particles, it is achieved that a large portion 73 of the secondary radiation 72 is reflected back in the direction toward sheet 1. Depending on the type of reflecting coating, degrees of reflection between 50% and 80% can be achieved. There, it does admittedly contribute to a reduced extent to heating up sheet 1. However, because of the cooling air flow in gap 27 or channels 28, only a fraction of that reflected heat can be emitted again toward body 18. Thermal insulation body 18 is thus able to absorb significantly less secondary radiation than if reflective coating 60 were not present. The amount of heat that was originally directed toward thermal insulation body 18 and passenger compartment 11 by the sun has thus been reduced to a fraction by the inventive cooperation of reflective layers 60 and 61, the cooling air flow and thermal insulation body 18.

Since some heat always reaches passenger compartment 11 despite all of the above-described measures, with the result that the passenger compartment temperature rises by 2 to 5° C. above the outside air temperature, especially at standstill, provision can usefully be made for passenger compartment to additionally be flushed with fresh air in a known manner, e.g from Audi, especially when the vehicle is at standstill.

The thermal vehicle insulation disclosed in the parent patent and the above-described complementary measures according to the invention in combination reduce the heat being transmitted into passenger compartment 11 of a motor vehicle to nearly less than one-fourth of that transmitted into the passenger compartment of a non-thermally insulated motor vehicle. The totality of the above-described measures or at least a combination of a majority of them thus has the effect that the cooling requirement of motor vehicles is reduced to a degree small enough that it can be satisfied by a small air-conditioning system. Small air-conditioning systems of this type thus reduce the significance of air-conditioning systems from a piece of equipment as it is currently used, which is capable only of air-conditioning, to the level of an auxiliary function in cases in which the inventive thermal insulation measures alone cannot completely meet certain individual needs.

Additionally, the reduction of the required cooling capacity to a fraction of that of modern air-conditioning systems opens up the special and particularly advanced possibility to operate small air-conditioning systems with solar power. The roof surface of most motor vehicles is sufficient to meet the cooling requirement that has been significantly reduced by thermal insulation measures with solar modules on the roof surface as a power source for small air-conditioning systems. This opens up, as particular progress, the possibility to operate air-conditioning systems even with the vehicle engine turned off, in addition to the inventive thermal insulation, and to keep a vehicle cooled to a level even at standstill or while parked that is below the temperature of the outside air. This means that even on extremely hot days or even in tropical regions, a desired temperature can be maintained in the vehicle interior even with the vehicle engine off. Needless fuel consumption with the resulting costs and high pollutant emissions from standing vehicles whose motor is kept running only to keep the vehicle cool can become a thing of the past.

Lastly, the present invention also serves to protect against the cold in the winter. The thermal insulation bodies according to parent patent initially serve as very high-quality insulation against entering cold. Added to this is the dead air in the cooling gap 27 or channels 28 when the associated flaps, or doors, are closed. Dead air is also a very good insulator. Since the thermal insulation bodies 18 have a very low bulk density, they allow IR radiation from the vehicle interior, i.e., from the passengers or warmer vehicle components, to radiate out. This radiation heat from the passenger compartment would be lost if reflective coating 60 on the surface of thermal insulation body (18) did not exist. Its existence ensures that the radiation is reflected back into the interior of the vehicle and a substantial amount of heat is thus not lost but is maintained in the interior of the vehicle. The additional heat that must be supplied to the passenger compartment by the vehicle heating system is also kept low as a result. The use of energy-consuming and emission causing auxiliary heaters can thus be eliminated.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. An automotive vehicle having an exterior surface, a passenger compartment and comprising a plurality of body parts, wherein two of said body parts are a roof and a door and each of said roof and said door having a longitudinal dimension that will extend in the direction of the length of the vehicle and a transverse dimension perpendicular to the longitudinal dimension and parallel to the exterior surface, and each of said roof and said door comprising:

an outer sheet having an outer surface that will form a part of the vehicle exterior surface;

an inner part disposed between said outer sheet and the passenger compartment when each of said roof and said door is assembled to the vehicle, said inner part having a surface that faces said outer sheet;

a first infrared radiation reflecting layer on said outer surface of said outer sheet; and a second infrared radiation reflecting layer on said surface of said inner part, wherein:

said inner part comprises a body of thermal insulation material;

said outer sheet and said inner part delimit an air flow path for supporting a flow of cooling air adjacent said outer sheet and in the direction of said longitudinal dimension, said air flow path extending, or being distributed, over said transverse dimension for transporting heat convectively away from the vehicle;

said air flow path having an air inlet and an air outlet, both communicating with air outside the vehicle when said roof and said door are assembled to the vehicle; and said air flow path is permanently isolated by said inner part from the passenger compartment.

2. The vehicle of claim 1, wherein said air flow path of at least one of said roof and said door is constituted by a plurality of channels distributed across substantially the entire transverse dimension, and said inner part is in contact with said outer sheet at locations between said channels.

3. The vehicle of claim 1, wherein said air flow path of at least one of said roof and said door is constituted by one of: a gap that extends across substantially the entire transverse dimension, and a plurality of channels distributed across substantially the entire transverse dimension.

4. The vehicle of claim 3, further comprising an air propelling device disposed for producing the cooling air flow though said air flow path of at least one of said roof and said door.

5. The vehicle of claim 4, further comprising solar cells connected for supplying operating power to said air propelling device.

6. The vehicle of claim 3, further comprising flow blocking means disposed for blocking air flow through said air flow path.

7. The vehicle of claim 6, wherein said flow blocking means comprise at least one flow blocking element associated with at least one of said air inlet and said air outlet.

8. The vehicle of claim 7, wherein said at least one flow blocking element comprises an inlet flow blocking element in said air inlet and an outlet flow blocking element in said air outlet.

9. The automotive vehicle of claim 1, further comprising an air blower coupled to said air flow path of said roof to produce the cooling air flow along said path.

10. The automotive vehicle of claim 9, further comprising solar cells connected for supplying operating power to said air blower.

11. The automotive vehicle of claim 9, further comprising flow blocking means disposed for blocking air flow through said air flow path.

12. The automotive vehicle of claim 1, further comprising flow blocking means disposed for blocking air flow through said air flow path of said roof.

13. The automotive vehicle of claim 1, further comprising a plurality of infrared radiation reflecting solar protection windows.

14. The automotive vehicle of claim 1, further comprising:

solar protection windows for achieving maximum solar insulation of said passenger compartment;
an air conditioner; and
a power source that is independent of the vehicle engine for powering said air conditioner.

15. The automotive vehicle of claim 14, wherein said power source comprises photovoltaic elements connected to said air conditioner in one of a direct manner and via storage batteries.

16. The automotive vehicle of claim 14, wherein said air conditioner has less capacity than air conditioners conventionally used in automotive vehicles.

* * * * *